(12) United States Patent
Stam et al.

(10) Patent No.: US 9,100,401 B2
(45) Date of Patent: Aug. 4, 2015

(54) SHARED APPLICATION STORE FOR A PLATFORM-AS-A-SERVICE (PAAS) SYSTEM

(71) Applicant: Red Hat, Inc., Raleigh, NC (US)

(72) Inventors: Kurt Stam, Ipswich, MA (US); Eric Wittmann, Sandy Hook, CT (US)

(73) Assignee: Red Hat, Inc., Raleigh, NC (US)

( * ) Notice: Subject to any disclaimer, the term of this patent is extended or adjusted under 35 U.S.C. 154(b) by 229 days.

(21) Appl. No.: 13/777,583

(22) Filed: Feb. 26, 2013

(65) Prior Publication Data
US 2014/0244716 A1    Aug. 28, 2014

(51) Int. Cl.
G06F 15/16    (2006.01)
H04L 29/08    (2006.01)
H04W 4/00    (2009.01)

(52) U.S. Cl.
CPC ............... *H04L 67/10* (2013.01); *H04W 4/003* (2013.01)

(58) Field of Classification Search
CPC ............................... H04L 67/10; H04W 4/003
USPC .......................................................... 709/203
See application file for complete search history.

(56) References Cited

U.S. PATENT DOCUMENTS

2011/0265164 A1* 10/2011 Lucovsky et al. .................. 726/7
2013/0340076 A1* 12/2013 Cecchetti et al. ............... 726/23

* cited by examiner

*Primary Examiner* — Tauqir Hussain
(74) *Attorney, Agent, or Firm* — Lowenstein Sandler LLP

(57) ABSTRACT

A shared application store for a platform-as-a-service (PaaS) system is disclosed. A method of the disclosure includes receiving, by a processing device of an application store, an indication of a selection of an application provided by the application store, the application configured for deployment on a platform-as-a-service (PaaS) system, issuing a command to create a copy of a repository associated with the selected application, wherein the command to create the copy further comprises tracking changes made to the copy and flowing the tracked changes to the repository from which the copy originates, and sending a copy of the repository in response to the command to create the copy, wherein the copy of the repository is deployed on the PaaS system for a user that selected the application.

20 Claims, 5 Drawing Sheets

SHARED APPLICATION STORE FOR A PLATFORM-AS-A-SERVICE (PAAS) SYSTEM

TECHNICAL FIELD

The embodiments of the disclosure relate generally to platform-as-a-service (PaaS) systems and, more specifically, relate to a shared application store for a PaaS system.

BACKGROUND

Currently, a variety of Platform-as-a-Service (PaaS) offerings exist that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware and software and provisioning hosting capabilities, providing the facilities to support the complete life cycle of building and delivering web application and service entirely available from the Internet. Typically, these facilities operate as one or more virtual machines (VMs) running on top of a hypervisor in a host server.

Current PaaS offerings allow customers to build their own custom applications either by writing code (application development) or by composition (e.g. gears, add-ons, plugins, etc). One problem encountered may be difficulty in building and deploying a new application on the PaaS offering. Some customers may not have enough technical know-how to easily accomplish this end product. For instance, to build and deploy an application on a PaaS system, the customer should know what components to build the application with, where to obtain these components, how to add the components to the PaaS platform, and how to configure the application on the PaaS platform. Furthermore, current PaaS offerings do not provide options for a pre-configured application that can be easily deployed and run by a customer without the customer's involvement in the build and deployment process.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for a shared application store for a Platform-as-a-Service (PaaS) system. The shared application store of embodiments of the disclosure provides a selection of published applications that can be implemented via gears on a PaaS system. A customer may access the application store and select an application to deploy on the PaaS system using the customer's PaaS system account. In some embodiments, the customer may also locally deploy the application on the customer's own device, with subsequent deployment to the PaaS system via the customer's local repository.

Embodiments of the application store include logic that can fork (e.g., create a copy that references an original) the selected application to the PaaS system locally (at customer's device) or remotely (at PaaS system remote repository). Because the application is deployed via a fork command, any changes that the customer makes to the deployed application may be tracked and flowed between the deployed copy and the master application copy. These changes may be provided as additional versions of the master application at the application store.

Previously, cloud providers allowed customers to build their own custom applications either by writing code (application development) or by composition (e.g. gears, add-ons, plugins, etc). Embodiments of the disclosure differ from that approach by allowing portions of and/or an entire application to be forked, modified, and contributed back to the marketplace of the application store. A variety of advantages result from this implementation, including, but not limited to, an enhanced community experience, ease of installation for users, an opportunity for system administrators (e.g., those who configure and deploy applications but not write applications) to participate in the Cloud Application marketplace, and a better and easier try-before-you-buy experience for users.

In one embodiment, a method of the disclosure includes receiving, by a processing device of an application store, an indication of a selection of an application provided by the application store, the application configured for deployment on a platform-as-a-service (PaaS) system, issuing a command to create a copy of a repository associated with the selected application, wherein the command to create the copy further comprises tracking changes made to the copy and flowing the tracked changes to the repository from which the copy originates, and sending a copy of the repository in response to the command to create the copy, wherein the copy of the repository is deployed on the PaaS system for a user that selected the application.

Figure 1:
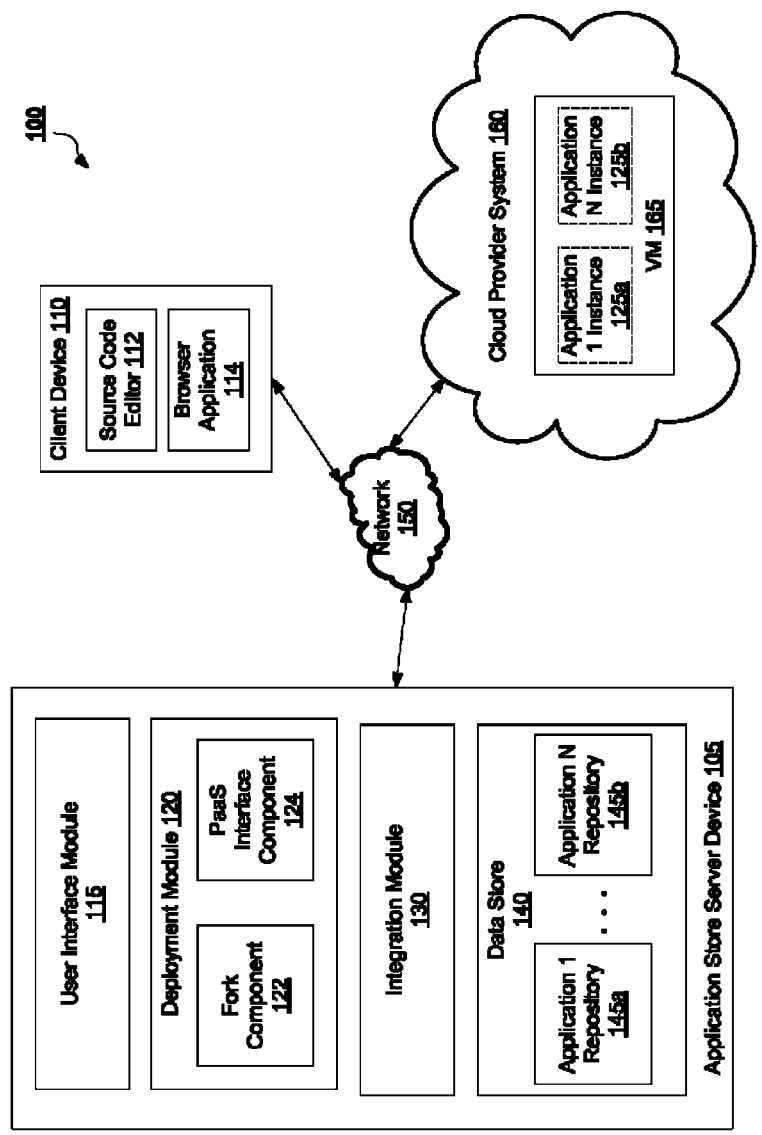
FIG. 1 is a block diagram of a network architecture supporting a shared application store for a PaaS system according to an embodiment of the disclosure.

FIG. 1 is a block diagram of a network architecture 100 supporting a shared application store for a PaaS system according to an embodiment of the disclosure. Network architecture 100 includes a client device 110 communicating with an application store server device 105 and a cloud provider system 160 over network 150. The network 150 may include, for example, the Internet in one embodiment. In other embodiments, other networks, wired and wireless, such as an intranet, local area network (LAN), wide area network (WAN), or broadcast network may be used.

The client device 110 may be any type of computing device, for example, a device including a processor, a computer-readable medium, and a memory. The client device 110 may be, for example, a personal computer, a laptop computer, a tablet computer, a personal digital assistant (PDA), a cellular telephone, etc. In some embodiments, the client device 110 may be executing a browser application 114 or other application adapted to communicate over Internet related protocols (e.g., TCP/IP and HTTP) and/or display a user interface. While a single client device 110 is shown in FIG. 1, network architecture 100 may support a large number of concurrent sessions with many client devices 110.

In one embodiment, client device 110 includes a source code editor application 112 ("editor") that is used to edit source code of computer programs. An end user of client device 110 may use editor 112 to make and submit code changes to source code of an application for a PaaS system. In one embodiment, the source code is provided to application store server device 105.

Application store server device 105 may be implemented on one or more computing devices including, but not limited to, server devices, desktop computers, laptop computers, mobile devices, and so on. In one embodiment, application store server device 105 receives and stores one or more repositories 145a-145b for applications. These received repositories 145a-145b may be stored in a data store 140 of application store server device 105. In one embodiment, the applications associated with the repositories 145a-145b may be applications run on a PaaS system. For example, repositories 145a, 145b include software code implemented via computer-readable instructions that provides one or more gears to be executed by the PaaS system. Each repository 145a, 145b may include components of a certain application or components of a certain gear that corresponds to an application or to a portion of the application.

In one embodiment, a gear is a resource-constrained process space to execute functionality of an application. For example, a gear may include one or more components of a composite application that includes functionality drawn from multiple sources (e.g., functions from other applications or systems). In some embodiments, a gear is established by a node (e.g., a virtual machine (VM)) of the PaaS system with resource boundaries, including a limit and/or designation of the amount of memory, amount of storage, and security types and/or labels to be applied to any functions executed by the gear. In one embodiment, gears may be established using the Linux Containers (LXC) virtualization method. In further embodiments, gears may also be established using cgroups, SELinux™, and kernel namespaces, to name a few examples.

In one embodiment, the PaaS system is a multi-tenant PaaS product hosted in a cloud computing environment, such as cloud provider system 160. The term "multi-tenant" refers to a feature of the PaaS system that hosts multiple different web applications having multiple different owners on a same virtual machine (VM) in the cloud computing environment. In production, such a multi-tenant PaaS system may execute utilizing multiple computing devices to provide multiple tiers of the PaaS system, with a variety of inter-related components and protocols. For example, the multiple tiers of the PaaS system may include a client layer hosting client tools to access the functionality of the PaaS system, a broker layer having multiple broker machines to coordinate and configure initialization of new end user applications, a node layer including nodes (e.g., VM, physical machine, etc.) to host the applications, messaging servers, a data store of a database, a Domain Name Service (DNS) server, and so on.

In embodiments of the disclosure, instances 125a-125b of the applications associated with repositories 145a-145b can be launched on a virtual machine (VM) 165 of the PaaS system that is hosted by cloud provider system 160. An end user may interact with and view the application instances 145a-145b using browser application 114 of client device 110.

In one embodiment, application store server device 105 includes a user interface module 115, a deployment module 120, an integration module 130, and the data store 140 to provide a shared application store to select and deploy pre-existing applications for the PaaS system. User interface module 115 provides a graphical user interface (GUI) displaying one or more already-built and configured applications 145a-145b available for deployment on a PaaS system. An end user may select one or more of the applications 145a-145 via the GUI provided by user interface module 115.

In one embodiment, deployment module 120 receives information identifying an application selected by an end user from a GUI provided by the application store server device 105. The deployment module 120 may include fork component 122 and PaaS interface component 124. Fork component 124 may access the repository 145a, 145b of the selected application from data store 140 and 'fork' the application for the end user. In one embodiment, forking is the action of creating a copy that references an original, so that changes can be tracked and flowed between the original (master) and the forked copy.

In one embodiment, the data store 140 implements a source code management system, sometimes referred to as "SCM" or revision control system. One example of such an SCM or revision control system is Git, available as open source software. Another example of an SCM system is Mercurial™. The SCM system may provide explicit support for forking operations. For example, the fork component 122 may coordinate with the SCM of data store 140 to cause the SCM to create a copy of a selected repository 145a, 145b as a new branch, with any later changes of that forked branch being integrated with the main repository 145a, 145b (Subject to error checking, etc.). In one embodiment, the fork component 122 may be an implementation of the github application.

In some embodiments, the fork component 122 interacts with PaaS interface module 124 to cause the forked repository 145a, 145b to be deployed as an application instance 125a, 125b on the PaaS system implemented in cloud provider system 160. In other embodiments, the forked repository 145a, 145 is deployed locally on the end user's client device 100, for example, on a locally-installed version of the PaaS system (not shown).

Figure 2:
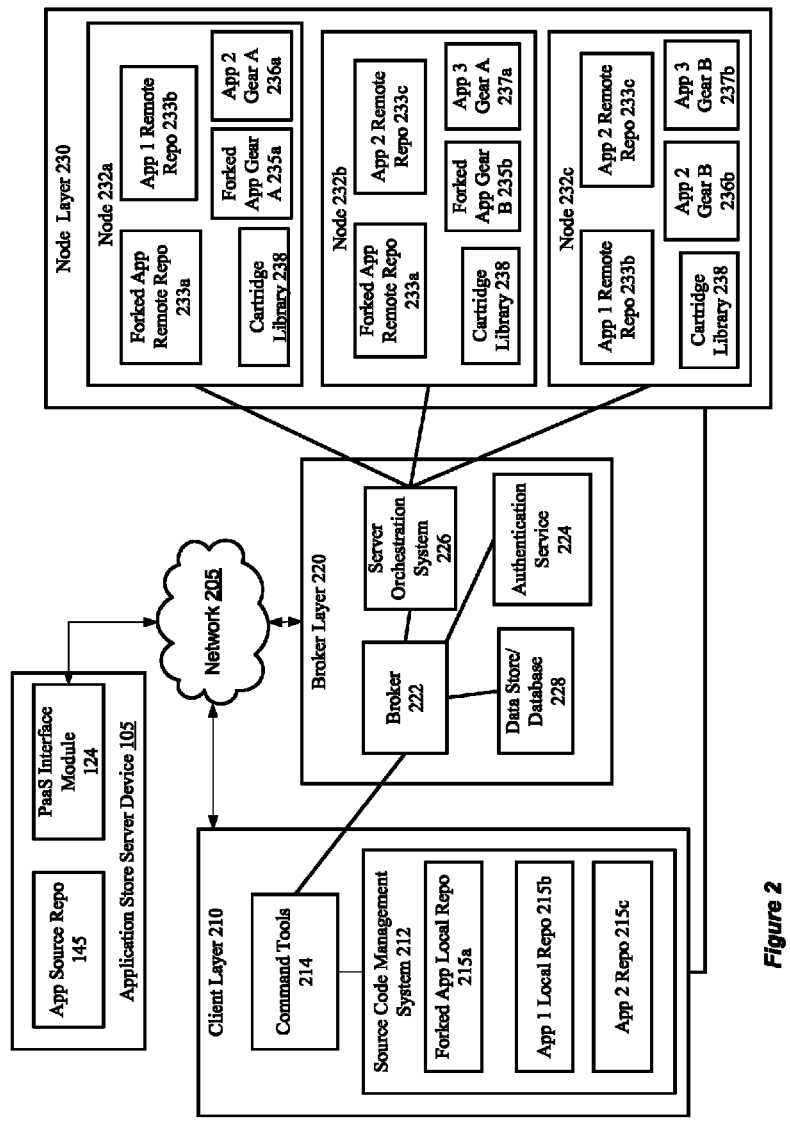
FIG. 2 is a block diagram of a PaaS system architecture to receive an application for deployment from a shared application store for the PaaS system according to an embodiment of the disclosure.

FIG. 2 is a block diagram of a PaaS system architecture to receive an application for deployment from a shared application store for the PaaS system according to an embodiment of the disclosure. The PaaS architecture allows users to launch software applications in a cloud computing environment, such as cloud computing environment offered by cloud provide system 160 described with respect to FIG. 1. The PaaS system architecture, in one embodiment, includes a client layer 210, a broker layer 220, and a node layer 230.

In one embodiment, the components of the PaaS system architecture are in communication, via network 205, with the PaaS Interface module 124 application store server device 105 of FIG. 1. Network 205 may include, for example, the Internet in one embodiment. In other embodiments, other networks, wired and wireless, such as an intranet, local area network (LAN), wide area network (WAN), or broadcast network may be used.

In one embodiment, the client layer 210 resides on a client machine, such as a workstation of a software developer, and provides an interface to a user of the client machine to a broker layer 220 of the PaaS system 200. In one embodiment, the client machine is the same as client device 110 described with respect to FIG. 1. The broker layer 220 may facilitate the creation and deployment on the cloud (via node layer 230) of software applications being deployed by an end user, via application store server device 105 of FIG. 1, at client layer 210.

In one embodiment, an end user at client layer 210 may select a fully-configured application from the application store server device 105. As discussed above, application store server device 105 may fork the stored repository 145 of the selected application. In one embodiment, the stored repository 145 is forked as a local copy directly to the client layer 210.

The client layer 210 includes an SCM system 212 having a local software repository 215a, 215b, 215c. In one embodiment, the forked repository may be stored locally at the end user device of client layer 210 as forked app local repo 215a. The SCM 212 of client layer 210 may also store other local copies of application repos, such as app1 local repo 215b and app 2 local repo 215c, for example.

Distributed SCM systems, such as SCM system 112, usually include a working directory for making changes, and a local software repository 215a, 215b, 215c for storing the changes for each application associated with the end user of the PaaS system 200. The packaged software application can then be "pushed" from the local SCM repository 215a, 215b, 215c to a remote SCM repository 233a, 233b, 233c at the node(s) 232a, 232b, 232c running the associated application. From the remote SCM repository 233a, 233b, 233c, the code may be edited by others with access, or the application may be executed by a machine. Other SCM systems work in a similar manner.

In some embodiment, PaaS Interface module 124 may interact with client layer 210 and broker layer 220 to cause a selected application repo 145 to be forked and deployed remotely on the PaaS system. Further description of this implementation is discussed below after introduction of components of the PaaS network architecture.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232a-c on which gears 235a-c of software applications are provisioned and executed. As previously discussed, a gear 235a-c may include a resource-constrained process space to execute functionality of an application. In some embodiments, a gear 235a-c is established by a node 232a-c with resource boundaries, including a limit and/or designation of the amount of memory, amount of storage, and security types and/or labels to be applied to any functions executed by the gear. In one embodiment, gears 235a-c may be established using the Linux Containers (LXC) virtualization method. In further embodiments, containers may also be established using cgroups, SELinux™, and kernel namespaces, to name a few examples.

In one embodiment, each node 232a-c is a VM provisioned by an Infrastructure as a Service (IaaS) provider. In other embodiments, the nodes 232a-c may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In some embodiments, cartridges instances (originating from cartridge library 237, as discussed below) for an application may execute in gears 235a-c dispersed over more than one node 232a-c, as shown with forked application gear A 235a on node 232a and forked application gear B 235b on node 232b. In other embodiments, cartridge instances for an application 305 may also run in one or more gears 235a-c on the same node 232a-c.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application, or some other action to manage the application, the broker 222 first authenticates the user using an authentication service 224. In one embodiment, the authentication service may comprise custom authentication methods, or standard protocols such as SAML, Oauth, etc. Once the user has been authenticated and allowed access to the system by authentication service 224, the broker 222 uses a server orchestration system 226 to collect information and configuration information about the nodes 232a-c.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232a-c, which are acting as application servers and web servers.

For example, if the broker 222 wanted to shut down all applications 235a-c on all even numbered nodes out of 100,000 nodes, the broker 222 may provide one command to the server orchestration system 226. Then, the server orchestration system 226 would generate and distribute a message to all nodes 232a-c to shut down all applications 235a-c if the node 232a-c is even, using a messaging and queuing system. Thus, in one embodiment, the broker 222 manages the business logic and model representing the nodes 232a-c and the applications (implemented via gears 235-237a, b) residing on the nodes, and acts as a controller that generates the actions requested by users via an API of the client tools 214. The server orchestration system 226 then takes the actions generated by the broker 222 and orchestrates their execution on the many nodes 232a-c managed by the system.

In one embodiment, the information collected about the nodes 232a-c can be stored in a data store 228. In one embodiment, the data store 228 can be a locally-hosted database or file store, or it can be a cloud based storage service provided by a Software-as-a-Service (SaaS) provider. The broker 222 uses the information about the nodes 232a-c and their applications to model the application hosting service and to maintain records about the nodes. In one embodiment, data of a node 232a-c is stored in the form of a JavaScript Object Notation (JSON) blob or string that maintains key-value pairs to associate a unique identifier, a hostname, a list of applications, and other such attributes with the node.

In embodiments of the disclosure, the PaaS system architecture 200 of FIG. 2 is a multi-tenant PaaS environment. In a multi-tenant PaaS environment, each node 232a-c runs multiple applications (via gears 235a-c) that may be owned or managed by different users and/or organizations. As such, a first customer's deployed applications may co-exist with any other customer's deployed applications on the same node 232 (VM) that is hosting the first customer's deployed applications. In some embodiments, portions of an application are run on multiple different nodes 232a-c. For example, as shown in FIG. 2, gears 235a, 235b of forked application are run in both node 232a and node 232b. Similarly, gears 236a, 236b application 2 are run in node 232a and node 232c, while gears 237a, 237b of application 3 are run in node 232b and node 232c.

In addition, each node also maintains a cartridge library 237. The cartridge library 237 maintains multiple software components (referred to herein as cartridges) that may be utilized by gears 235-237a, b of the applications deployed on node 232a-c. A cartridge can represent a form of support software (or middleware) providing the functionality, such as configuration templates, scripts, dependencies, to run a gear 235-237a, b of an application and/or add a feature to an application. In one embodiment, the cartridges support languages such as, but not limited to, JBoss™, PHP, Ruby, Python, Perl, and so on.

In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to a gear 235-237a, b of an application provides a capability for the application without the customer who owns the application having to administer or update the included capability.

As discussed above, embodiments of the disclosure include the PaaS interface module 124 interacting with client layer 210 and broker layer 220 to cause a selected application repo 145 to be forked and deployed remotely on the PaaS system. For example, PaaS interface module 124 may interact with authentication service 224 to authenticate the end user selecting an application repo at the PaaS system. Once authenticated, the PaaS interface module may interact with broker layer 220, on the end user's behalf, to cause a new application to be created at the node layer 230 under a PaaS account of the end user using the forked repo. The forked repo 145 may be stored in a remote repo 233a at the node layer 230.

The remote SCM repositories 233a, 233b, 233c store applications for editing and/or for execution on the node 232a, 232b, 232c. In one embodiment, there is a remote SCM repository 233a on each node 232a, 232b that executes the forked application. For example, the forked repo may be stored to one or more nodes 232a, 232b as forked app remote repo 233a and then deployed. In one embodiment, each fork of the repository would embody a different and unique configuration of the application. When forking the application, the contents of the repository are cloned onto the destination (e.g., the remote repo or local VM node). That cloned repository is the executable application, all of the application's components, and the specific/unique configuration for the application. The differences between two "forks" of the repository may be isolated to the configuration settings of each forked repository.

Nodes 232a, 232b may then execute forked app gears A and B 235a, 235b to implement functionality of the forked application for the end user.

In some embodiments, a local copy of the forked repo, which refers to the remote repo 233a, may also be stored at the client layer as discussed above. This allows the end user to make code changes to the forked application, and then store those changes in the local SCM repository 215a associated with the forked application. The updated software application can then be provided (e.g., "pushed") from the local SCM repository 215a to the remote SCM repository 233a.

Due to the nature of forking an application, changes made to the source code of the application may be integrated back to the master copy from which the forked application originated. As a result, in some embodiments, the changes made to the forked app local repo 215 and/or the forked app remote repo 233a may be contributed back to the master copy of the application provided by the application store server device 105. Each copy of the forked application repository 215a, 233a may include identifying information of the location and identification of the master copy of the application repo that acted as the originating source.

As a result, the SCM system 212 can implement functionality to cause changes made to the local repo 215a or remote repo 233a to be pushed back to the app source repo 145 at the application store server device 105. The application store server device 105 may then display the updated version of the application as a different version of the application. In some embodiments, revision and/or error controls may be implemented to provide control over when and if contributed changes are integrated into the master copy of the application source code.

Figure 3:
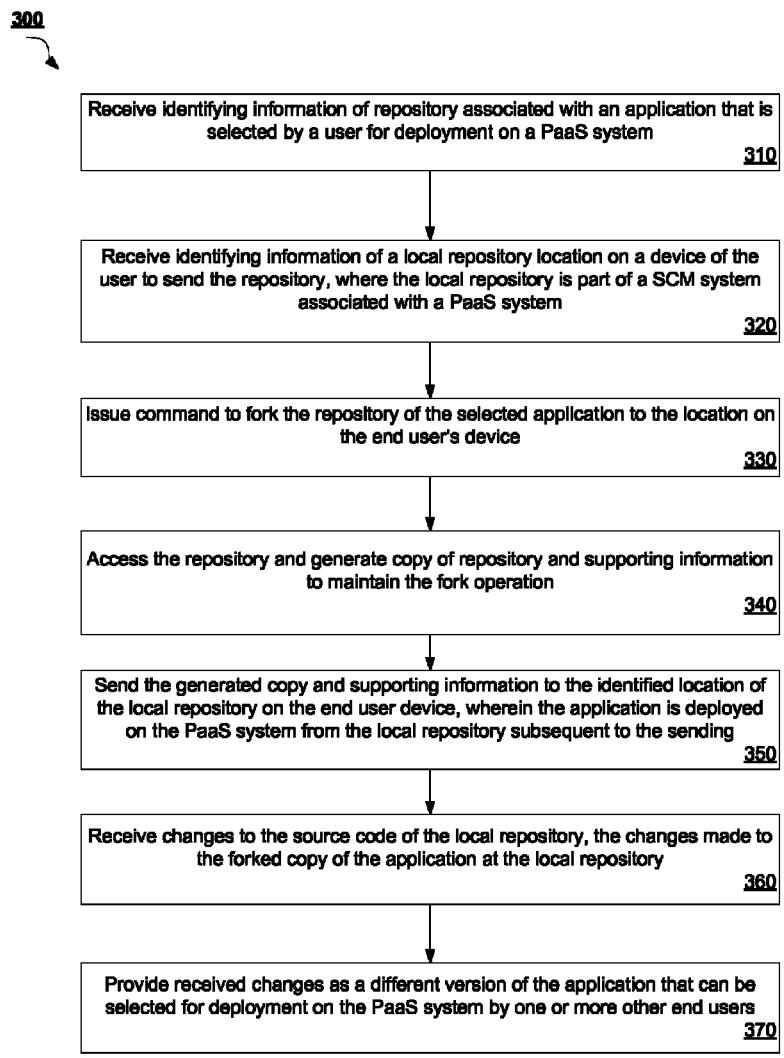
FIG. 3 is a flow diagram of a method for providing an application from a shared application store for deployment on a PaaS system via a local repository of a user's device according to an embodiment of the disclosure.

FIG. 3 is a flow diagram illustrating a method 300 for providing an application from a shared application store for deployment on a PaaS system via a local repository of a user's device according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by application store server device 105 of FIG. 1.

Method 300 begins at block 310 where identifying information of a repository stored by a shared application store is received. The repository may include the application, all of the application's components, and the specific/unique configuration of the particular version of the application in the repository. In one embodiment, the repository is associated with an application that is selected by a user for deployment on a PaaS system. The application may be selected via a GUI provided by the application store server device, where the GUI provides a listing of pre-configured and/or pre-built applications that are ready for deployment in the PaaS system. In addition, the repository of the selected application may be stored in a data store of the application store server device. The data store may be part of a SCM system executed by the application server device.

At block 320, identifying information of a local repository location on a device of the user is received. In one embodiment, the local repository is a location to which the repository of the selected application is to be sent. The local repository of the user's device may be part of a SCM system that is associated with the PaaS system.

Subsequently, at block 330, a command to fork the repository of the selected application is issued. The command to fork includes a destination of the local repository of the user's device, whose location was previously provided in block 320. In one embodiment, the fork command is the action of creating a copy that references an original, so that changes can be tracked and flowed between the original (master) and the forked copy.

At block 340, the repository of the selected application is accessed and a copy of the repository is generated. Furthermore, supporting information to maintain the forking operation is also generated. In one embodiment, this supporting information may include identifying information of a location of the master copy of the repository, versioning information, and so on. At block 350, the generated copy of the repository and the supporting information are sent to the identified location of the local repository on the user's device. The application may then be deployed on the PaaS system from the local repository subsequent to the sending.

At block 360, changes made to the source code of the application at the local repository are sent to the application store server device. The fork operation and sending of the supporting information enables changes made to a forked repository to be contributed back to a master repository. In one embodiment, if the repository is part of a Git SCM, then a push command is used by the local repository to contribute any changes to the source code back to the master repository. Lastly, at block 370, the received changes are provided as a different version of the application that can be selected for deployment on the PaaS system by the user, as well as other users.

Figure 4:
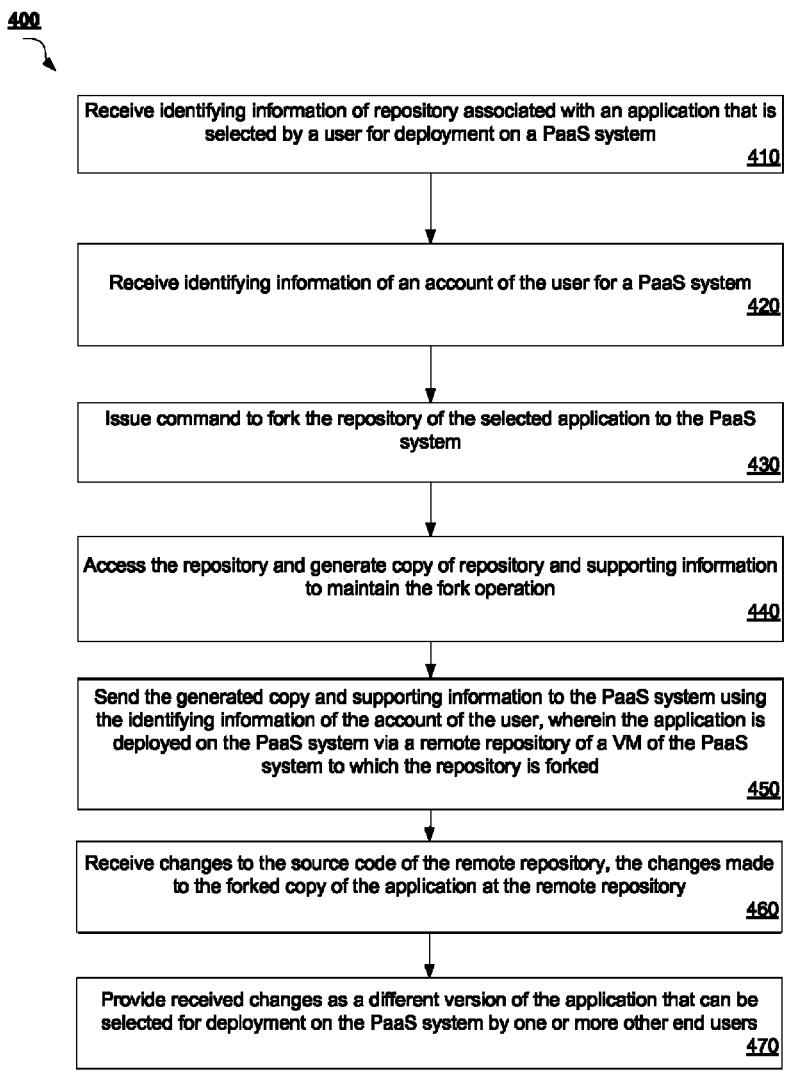
FIG. 4 is a flow diagram of a method for providing an application from a shared application store for deployment on a PaaS system via a remote repository associated with an PaaS system account associated with a user that selected the application according to an embodiment of the disclosure.

FIG. 4 is a flow diagram illustrating a method 400 for providing an application from a shared application store for deployment on a PaaS system via a remote repository associated with a PaaS system account associated with a user that selected the application according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by application store server device 105 of FIG. 1.

Method 400 begins at block 410 where identifying information of a repository is received. In one embodiment, the repository is associated with an application that is selected by a user for deployment on a PaaS system. The application may be selected via a GUI provided by the application store server device, where the GUI provides a listing of pre-configured and/or pre-built applications that are ready for deployment in the PaaS system. In addition, the repository of the selected application may be stored in a data store of the application store server device. The data store may be part of a SCM system executed by the application server device.

At block 420, identifying information of a PaaS system account of the user that selected the application is received. In one embodiment, the user may provide this information to the application store server device as intermediary. In other embodiments, the user may directly provide this identifying information to the PaaS system. Then, at block 430, a command to fork the repository of the selected application is issued. The command to fork includes a destination of the PaaS system to send the forked repository. In one embodiment, the fork command is the action of creating a copy that references an original, so that changes can be tracked and flowed between the original (master) and the forked copy.

At block 440, the repository of the selected application is accessed and a copy of the repository is generated. Furthermore, supporting information to maintain the forking operation is also generated. In one embodiment, this supporting information may include identifying information of a location of the master copy of the repository, versioning information, and so on. At block 450, the generated copy of the repository and the supporting information are sent to the PaaS system. In one embodiment, the identifying information of the PaaS user account is utilized when providing the forked copy and the supporting information. The account information is used by the PaaS system to deploy the forked repository on a remote repository of the PaaS system, where the remote repository is implemented on a node of the PaaS system (e.g., a VM executing on a cloud provider system) subsequent to the sending.

At block 460, changes made to the source code of the application at the remote repository are sent to the application store server device. The fork operation and sending of the supporting information enables changes made to a forked repository to be contributed back to a master repository. In one embodiment, if the repository is part of a Git SCM, then a push command is used by the remote repository to contribute any changes to the source code back to the master repository. Lastly, at block 470, the received changes are provided as a different version of the application that can be selected for deployment on the PaaS system by the user, as well as other users.

Figure 5:
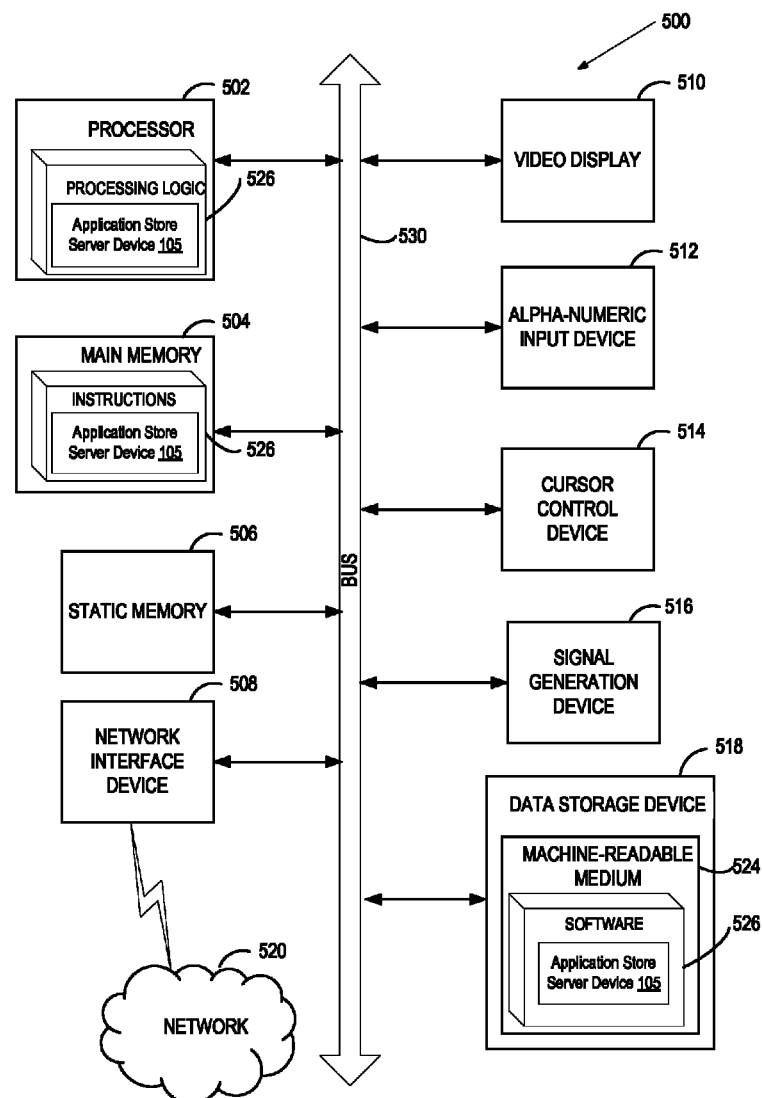
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement an application store server device 105 to provide a shared application store for a PaaS system in a computer system, such as the computer system described with respect to FIG. 1, and/or a software library containing methods that call the above applications. While the machine-accessible storage medium 528 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "issuing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes of embodiments of the disclosure, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the described method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite those features regarded as the disclosure.

What is claimed is:

1. A method, comprising:
   receiving, by a processing device of an application store, an indication of a selection of an application provided by the application store, the application configured for deployment on a platform-as-a-service (PaaS) system;
   issuing, by the processing device, a fork command to create a copy repository comprising a copy of a master repository corresponding to the selected application;
   in response to the fork command:
   creating, by the processing device, the copy repository; and
   sending, by the processing device, the copy repository for deployment on the PaaS system, wherein the fork command to cause changes made to the copy repository during the deployment on the PaaS system to be tracked and to cause the tracked changes to flow to the master repository without altering the master repository.

2. The method of claim 1, wherein the copy repository is stored at a local repository on a device of user providing the indication.

3. The method of claim 1, wherein the copy repository is stored at a remote repository on a node of the PaaS system.

4. The method of claim 3, wherein the node is a virtual machine (VM).

5. The method of claim 1, wherein the master repository is provided by a source code management (SCM) system.

6. The method of claim 1, further comprising receiving the tracked changes to code repository.

7. The method of claim 6, further comprising providing the received tracked changes as a different version of the master repository of the application, wherein the different version can be selected for deployment on the PaaS system by a plurality of users.

8. A system, comprising:
   a memory; and
   a processing device communicably coupled to the memory, the processing device to:
   provide a graphical user interface (GUI) comprising a listing of applications configured for deployment on a platform-as-a-service (PaaS) system;
   receive an indication of a selected application via the GUI;
   issue a fork command to fork a master repository corresponding to the selected application;
   in response to the fork command:
   generate a copy repository comprising a copy of the master repository and supplemental information associated with the master repository to support the fork command; and
   send the copy repository and the supplemental information for deployment on the PaaS system, wherein the fork command to cause changes made to the copy repository during the deployment on the PaaS system to be tracked and to cause the tracked changes to flow to the master repository without altering the master repository.

9. The system of claim 8, wherein the copy repository is stored at a local repository on a device of user providing the indication.

10. The system of claim 8, wherein the copy repository is stored at a remote repository on a node of the PaaS system.

11. The system of claim 8, wherein the master repository is provided by a source code management (SCM) system.

12. The system of claim 8, wherein the supplemental information comprises previous versions of the master repository and a location of the master repository on the system to send updates to the master repository.

13. The system of claim 8, wherein the processing device is further to receive the tracked changes to the copy repository.

14. The system of claim 13, wherein the processing device is further to provide the received tracked changes as a different version of the master repository of the application, wherein the different version can be selected for deployment on the PaaS system by a plurality of users.

15. A non-transitory machine-readable storage medium including data that, when accessed by a processing device, cause the processing device to:
   receive, by a processing device of an application store, an indication of a selection of an application provided by the application store, the application configured for deployment on a platform-as-a-service (PaaS) system;
   issue, by the processing device, a fork command to create a copy repository comprising a copy of a master repository corresponding to the selected application;
   in response to the fork command:
   create, by the processing device, the copy repository; and
   send, by the processing device, the copy repository for deployment on the PaaS system, wherein the fork command to cause changes made to the copy repository during the on the PaaS system to be tracked and to cause the tracked changes to flow to the master repository without altering the master repository.

16. The non-transitory machine-readable storage medium of claim 15, wherein the copy repository is stored at a local repository on a device of user providing the indication.

17. The non-transitory machine-readable storage medium of claim 15, wherein the copy repository is stored at a remote repository on a node of the PaaS system.

18. The non-transitory machine-readable storage medium of claim 15, wherein the master repository is provided by a source code management (SCM) system.

19. The non-transitory machine-readable storage medium of claim 15, further comprising:
   receiving the tracked changes to the copy repository; and
   providing the received tracked changes as a different version of the copy repository of the application, wherein the different version can be selected for deployment on the PaaS system by a plurality of users.

20. The method of claim 1, wherein the PaaS system comprises one or more nodes, wherein each of the one or more nodes executes a plurality of application each having different owners.

* * * * *